United States Patent
Miyoshi et al.

(10) Patent No.: US 10,408,500 B2
(45) Date of Patent: Sep. 10, 2019

(54) TURBO REFRIGERATION APPARATUS

(71) Applicant: MITSUBISHI HEAVY INDUSTRIES THERMAL SYSTEMS, LTD., Tokyo (JP)

(72) Inventors: Naoya Miyoshi, Tokyo (JP); Kenji Ueda, Tokyo (JP); Noriyuki Matsukura, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 15/571,075

(22) PCT Filed: Aug. 4, 2016

(86) PCT No.: PCT/JP2016/073012
§ 371 (c)(1),
(2) Date: Nov. 1, 2017

(87) PCT Pub. No.: WO2017/038376
PCT Pub. Date: Mar. 9, 2017

(65) Prior Publication Data
US 2018/0135893 A1 May 17, 2018

(30) Foreign Application Priority Data
Aug. 28, 2015 (JP) .................. 2015-169270

(51) Int. Cl.
*F25B 1/10* (2006.01)
*F25B 41/04* (2006.01)
*F25B 1/053* (2006.01)

(52) U.S. Cl.
CPC ............... *F25B 1/053* (2013.01); *F25B 1/10* (2013.01); *F25B 41/04* (2013.01);
(Continued)

(58) Field of Classification Search
CPC .... F04D 25/16; F04D 17/122; F25B 2400/13; F25B 2400/23; F25B 43/00; F25B 1/053; F25B 1/10
See application file for complete search history.

(56) References Cited

U.S. PATENT DOCUMENTS

| | | | | |
|---|---|---|---|---|
| 2010/0326130 A1* | 12/2010 | Takada | ...................... | F25B 1/10 62/510 |
| 2013/0133359 A1* | 5/2013 | Ueda | ..................... | F25B 31/004 62/471 |
| 2015/0096315 A1 | 4/2015 | Li et al. | | |

FOREIGN PATENT DOCUMENTS

| | | |
|---|---|---|
| JP | 59-52352 B2 | 12/1984 |
| JP | 11051502 A * | 2/1999 |

(Continued)

OTHER PUBLICATIONS

"Machine Translation of JP,2009-204260 A, Hasegawa et al, Sep. 2009".*

(Continued)

*Primary Examiner* — Frantz F Jules
*Assistant Examiner* — Martha Tadesse
(74) *Attorney, Agent, or Firm* — Birch, Stewart, Kolasch & Birch, LLP

(57) ABSTRACT

The purpose of the present invention is to install an economizer having a sufficient internal volume in a compact turbo refrigeration apparatus specifically using a low-pressure refrigerant, and reduce refrigerant pressure loss and enhance efficiency in the turbo refrigeration apparatus. The turbo refrigeration apparatus according to the present invention comprises: a turbo compressor which compresses a refrigerant; a condenser which condenses the compressed refrigerant; a control valve which causes the condensed refrigerant to expand; an evaporator which causes the expanded refrigerant to evaporate; and an economizer which is (Continued)

installed in such a manner as to be sandwiched between the condenser and the evaporator, and separates the refrigerant expanded by the control valve into gas and liquid. The economizer is installed adjacent to a curved wall, having a drum shell shape, of the condenser and/or the evaporator, the curved wall being shared with the structural wall of the economizer. The economizer has a height (H) greater than the maximum width (W) thereof when viewed in the longitudinal direction thereof.

8 Claims, 5 Drawing Sheets

(52) U.S. Cl.
CPC ... *F25B 2400/075* (2013.01); *F25B 2400/121* (2013.01); *F25B 2400/13* (2013.01); *F25B 2400/23* (2013.01); *F25B 2500/01* (2013.01); *F25B 2600/021* (2013.01); *Y02B 30/741* (2013.01)

(56) References Cited

FOREIGN PATENT DOCUMENTS

| JP | 11166770 A | * | 6/1999 |
|----|------------|---|--------|
| JP | 2000-292011 A | | 10/2000 |
| JP | 2009-204259 A | | 9/2009 |
| JP | 2009-204260 A | | 9/2009 |
| JP | 2009204258 A | * | 9/2009 |
| JP | 2009204259 A | * | 9/2009 |
| JP | 2009204260 A | * | 9/2009 |
| JP | 2009204260 A | * | 9/2009 |
| JP | 2011017455 A | * | 1/2011 |
| JP | 2014066396 A | * | 4/2014 |
| JP | 2014-163586 A | | 9/2014 |

OTHER PUBLICATIONS

International Search Report dated Oct. 25, 2016 in International Application No. PCT/JP2016/073012 with an English Translation.
Written Opinion of the International Searching Authority dated Oct. 25, 2016 in International Application No. PCT/JP2016/073012 with an English Translation.

* cited by examiner

TURBO REFRIGERATION APPARATUS

TECHNICAL FIELD

The present invention relates to a turbo refrigeration apparatus and particularly to a turbo refrigeration apparatus in which an installation structure of an economizer is devised.

BACKGROUND ART

For example, as shown in FIG. 3 of PTL 1, in a turbo refrigeration apparatus which is used for a heat source of district heating and cooling, drum shell-shaped condenser and evaporator are installed to be parallel to each other along with one or a plurality of turbo compressor, and an economizer which gas-liquid separation and intermediate cooling of a refrigerant are disposed around the condenser or evaporator. In a turbo refrigeration apparatus which uses a high-pressure refrigerant of R134a or the like, that is, a refrigerant used at a maximum pressure of 0.2 MPaG or more, the economizer is also formed in a drum shell shape in order to secure strength.

CITATION LIST

Patent Literature

[PTL 1] Japanese Unexamined Patent Application Publication No. 2009-204260

SUMMARY OF INVENTION

Technical Problem

As described above, the economizer is formed in a drum shell shape. Accordingly, when the economizer is disposed along with equipment such as the turbo compressor, the condenser, or the evaporator, it is not possible to effectively use an empty space positioned between the equipment, and thus, there is a problem that compactness of the turbo refrigeration apparatus is impaired.

In addition, in a case where a plurality of turbo compressors are provided, a plurality of economizers are required. Accordingly, the space occupied by the plurality of economizers further increases, and thus, the problem gets worse. Moreover, it is necessary to connect the plurality of turbo refrigeration apparatus and the plurality of economizers to each other by refrigerant pipes. Therefore, an install space for the refrigerant pipes is required, a press loss of the refrigerant increases due to the increase of the refrigerant pipes, and equipment performance (efficiency) decreases.

Moreover, in a case where a low-pressure refrigerant such as R1233zd used in a maximum pressure less than 0.2 MPaG, the lower-pressure refrigerant has characteristics in which a gas specific value is large. Accordingly, a gas flow rate in the apparatus increases, and compared to the turbo refrigeration apparatus which uses the high-pressure refrigerant, a body size of the economizer increases, and thus, compactness of the turbo refrigeration apparatus is impaired.

The present invention is made in consideration of the above-described circumstances, and an object thereof is to provide a turbo refrigeration apparatus capable of improving compactness while installing an economizer having a sufficient internal volume in a turbo refrigeration apparatus which uses a low-pressure refrigerant, particularly, and decreasing a pressure loss of a refrigerant to increase efficiency.

Solution to Problem

In order to achieve the object, the present invention adopts the following means.

That is, according to an aspect of the present invention, there is provided a turbo refrigeration apparatus, including: a turbo compressor which compresses a refrigerant; a condenser which condenses the compressed refrigerant; a control valve which expands the condensed refrigerant; an evaporator which evaporates the expanded refrigerant; and an economizer which is installed to be interposed between the condenser and the evaporator and separates the refrigerant expanded by the control valve into gas and liquid.

According to the turbo refrigeration apparatus having the above-described configuration, the economizer is installed to be interposed between the condenser and the evaporator, and thus, it is possible to install the economizer while effectively using an empty space positioned between the condenser and the evaporator.

Particularly, in the turbo refrigeration apparatus in which a low-pressure refrigerant is used, strength required for the economizer is lower than that in a case where a high-pressure refrigerant is used, and thus, the economizer may not be formed in a drum shell shape.

Accordingly, the economizer is formed in a free shape to be installed in the empty space between the condenser and the evaporator, and thus, a sufficient internal volume is provided in the economizer, and it is possible to increase gas-liquid separation performance.

In the above-described configuration, the economizer may be installed to be adjacent to a drum shell-shaped curved wall of at least one of the condenser and the evaporator and the curved wall may be shared as a structure wall of the economizer itself.

Accordingly, the economizer comes into close contact with at least one of the condenser and the evaporator without a gap. Accordingly, the empty space between the economizer and the condenser is maximally used, and thus, a more compact turbo refrigeration apparatus can be configured while the internal volume of the economizer is expanded.

In the above-described configuration, the economizer may be formed to extend in a longitudinal axis direction of the adjacent curved wall and have a height dimension of the economizer which is greater than a maximum width dimension thereof when viewed in the longitudinal axis direction.

In this way, the height dimension of the economizer can be obtained, and particularly, it is possible to improve gas-liquid separation performance of the economizer in a turbo refrigeration apparatus which uses a low-pressure refrigerant.

In the above-described configuration, in a case where a plurality of turbo compressors are provided, the economizer may include a gas-liquid inflow chamber into which the refrigerant expanded by the control valve flows in a gas-liquid mixed state, and a plurality of gas-liquid separation chambers which are adjacent to the gas-liquid inflow chamber and respectively close to the plurality of turbo compressors so as to separate the refrigerant into gas and liquid, supply a gas phase component to the turbo compressors, and supply a liquid phase component to the evaporator.

According to this configuration, the plurality of gas-liquid separation chambers of the economizer are respectively disposed at positions closest to the plurality of turbo compressors, and thus, the gas-liquid separation chambers can be connected to the turbo compressors at the shortest distances. Accordingly, the length of the refrigerant pipe connecting the economizer and the turbo compressor to each other can be minimized and can be formed linearly, and thus, compactness of the turbo refrigeration apparatus is improved, and it is possible to decrease a pressure loss of the refrigerant to increase efficiency.

In the economizer having the above-described configuration, two gas-liquid separation chambers may be arranged back to back in a state where one gas-liquid inflow chamber is interposed therebetween.

Accordingly, the one gas-liquid inflow chamber is shared as the two gas-liquid separation chambers, and the refrigerant in a gas-liquid mixed state flowing into the gas-liquid inflow chamber is divided into both gas-liquid separation chambers so as to be sucked into the turbo compressor.

In this way, the refrigerant in a gas-liquid mixed state flowing into the gas-liquid inflow chamber is sucked into both gas-liquid separation chambers, and thus, the flow rate of the refrigerant inside the gas-liquid inflow chamber decreases, and it is possible to increase gas-liquid separation effects.

Accordingly, compared to a case where two gas-liquid inflow chambers and two gas-liquid separation chambers are provided, if the same level of gas-liquid separation performance is obtained, the size of the economizer decreases, and thus, compactness of the turbo refrigeration apparatus can be realized.

In the turbo refrigeration apparatus having the above-described configuration, another auxiliary device along with economizer may be installed between the condenser and the evaporator, and another auxiliary device may be installed to be adjacent to a drum shell-shaped curved wall of at least one of the condenser and the evaporator and the curved wall may be shared as a structure wall of the auxiliary device itself.

According to the configuration, the auxiliary device other than the economizer can be installed by effectively using the empty space positioned between the condenser and the evaporator. Particularly, it is suitable for a tank-shaped auxiliary device such as the lubricant tank to which a high pressure is not applied.

Advantageous Effects of Invention

As described above, according to the turbo refrigeration apparatus according to the present invention, particularly, in a case of a turbo refrigeration apparatus which uses a low-pressure refrigerant, it is possible to improve compactness of the turbo refrigeration apparatus while installing the economizer having a sufficient internal volume, and it is possible to decrease a pressure loss of a refrigerant to increase efficiency.

DESCRIPTION OF EMBODIMENTS

Hereinafter, an embodiment of the present invention will be described with reference to the drawings.

Figure 1:
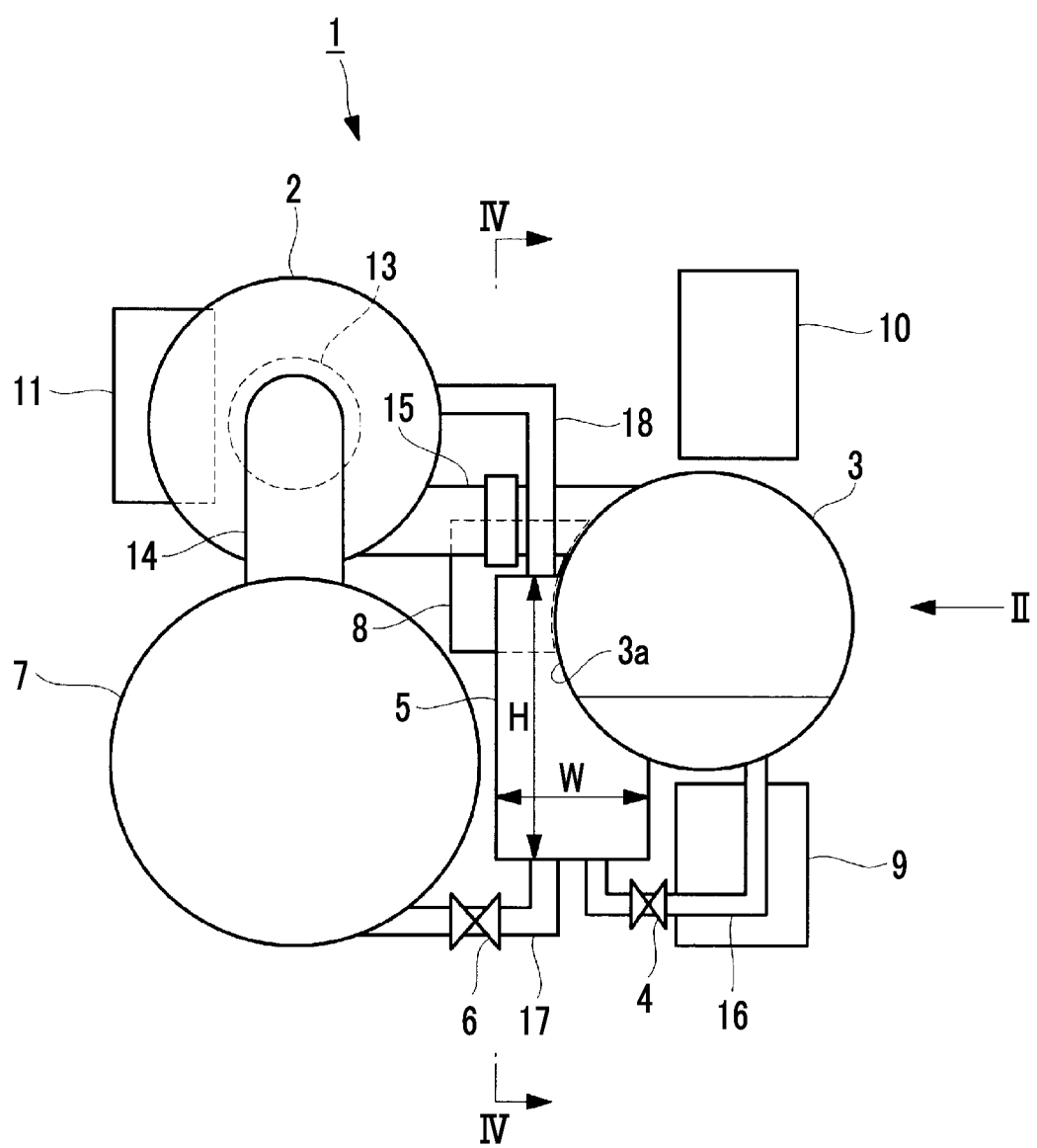
FIG. 1 is a front view of a turbo refrigeration apparatus according to an embodiment of the present invention.
Figure 2:
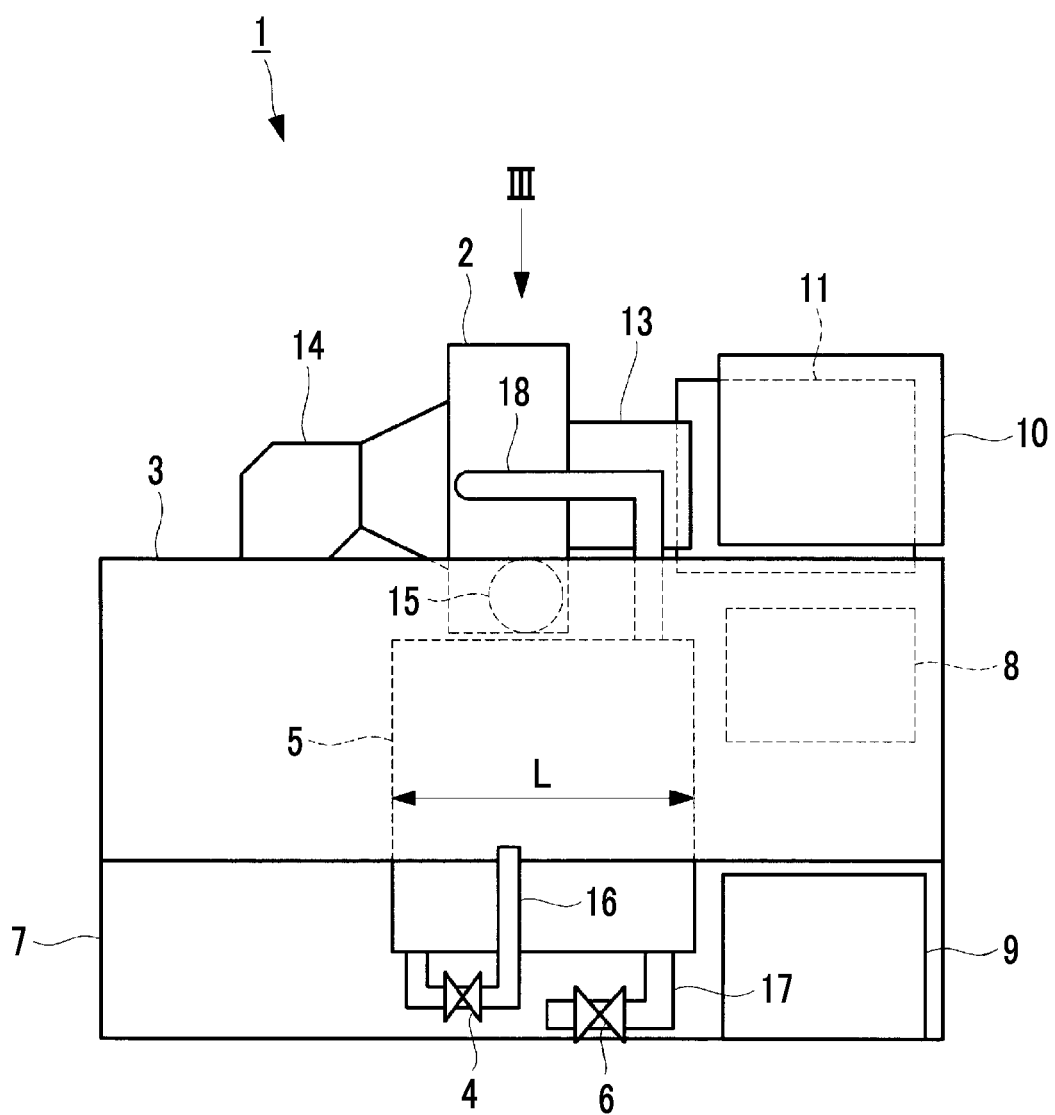
FIG. 2 is a side view of the turbo refrigeration apparatus when viewed from an arrow II of FIG. 1.
Figure 3:
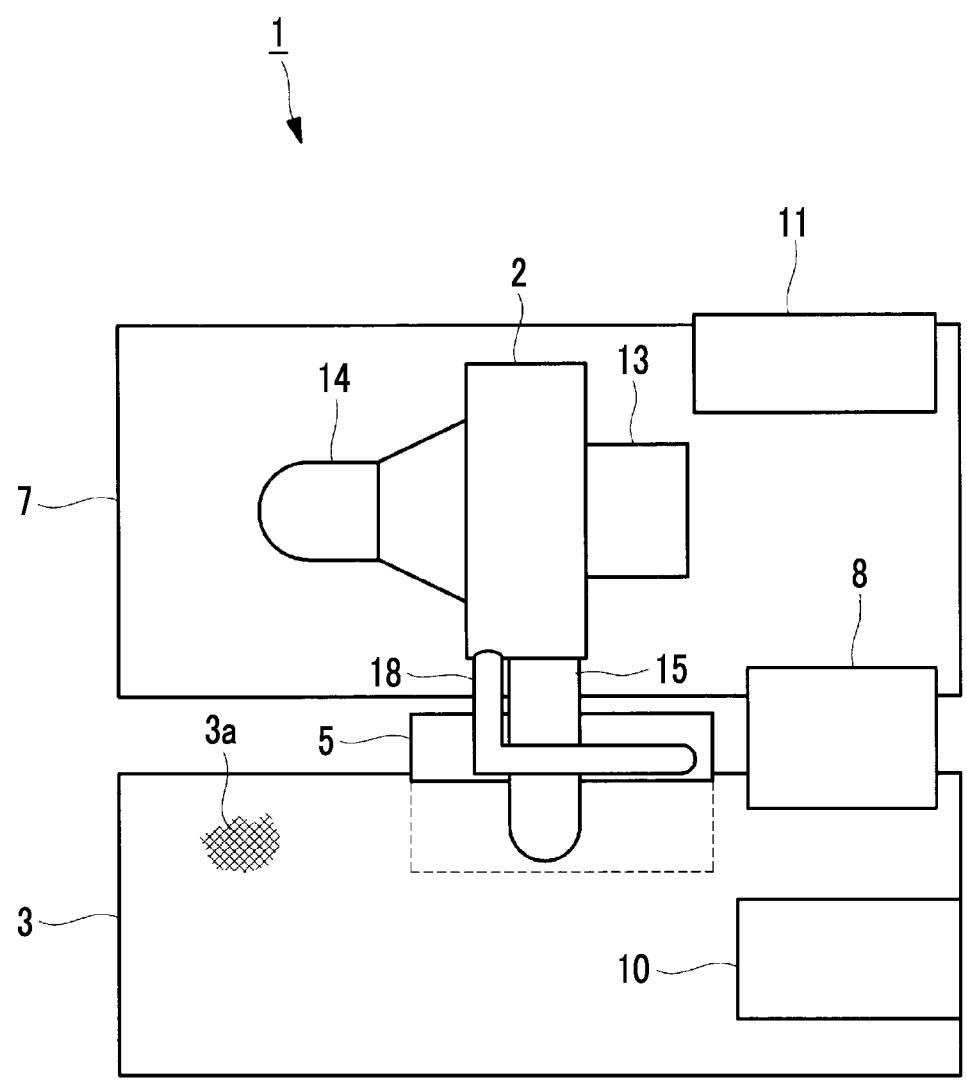
FIG. 3 is a plan view of the turbo refrigeration apparatus when viewed from an arrow III of FIG. 2.

FIGS. 1 to 3 show schematic configuration views of a turbo refrigeration apparatus 1 according to the present embodiment. FIG. 1 is a front view, FIG. 2 is a side view, and FIG. 3 is a plan view.

The turbo refrigeration apparatus 1 is formed in a unit shape including a turbo compressor 2 which compresses a refrigerant, a condenser 3, a high-pressure expansion valve 4 (control valve), an economizer 5, a low-pressure expansion valve 6, an evaporator 7, a lubricant tank 8 (auxiliary device), a circuit box 9, an inverter unit 10, an operation panel 11, or the like. The lubricant tank 8 is a tank in which a lubricant supplied to a bearing of the turbo compressor 2, a speed increaser, or the like is stored.

The condenser 3 and the evaporator 7 are formed in a drum shell shape having high pressure resistance and are disposed to be parallel to each other so as to be adjacent to each other in a state where axes thereof extend in an approximately horizontal direction. The condenser 3 is disposed at a position relatively higher than the evaporator 7 and the circuit box 9 is installed below the condenser 3. The economizer 5 and the lubricant tank 8 are installed so as to be interposed between the condenser 3 and the evaporator 7. The inverter unit 10 is installed above the condenser 3 and the operation panel 11 is disposed above the evaporator 7. Each of the lubricant tank 8, the circuit box 9, the inverter unit 10, and the operation panel 11 is disposed so as not to largely protrude from the entire contour of the turbo refrigeration apparatus 1 in a plan view (refer to FIG. 3).

The turbo compressor 2 is a well-known centrifugal turbine type compressor which is rotationally driven by an electric motor 13, and is disposed above the evaporator 7 in a state where an axis of the turbo compressor 2 extends in an approximately horizontal direction. The electric motor 13 is driven by the inverter unit 10, and the turbo compressor 2 compresses a gaseous refrigerant supplied via a suction pipe 14 from the evaporator 7 and feeds the compressed refrigerant from a discharge pipe 15 to the condenser 3. For example, as the refrigerant, a low-pressure refrigerant such as R1233zd used in a maximum pressure less than 0.2 MPaG is used.

In the inside of the condenser 3, a high-temperature refrigerant compressed by the turbo compressor 2 is heat-exchanged with water, and thus, heat of condensation of the refrigerant is cooled and the refrigerant is condensed and liquefied. Here, the heated water is used as a heat medium or the like for heating. The refrigerant in a liquid phase in the condenser 3 passes through the high-pressure expansion valve 4 provided in a refrigerant pipe extended from the condenser 3 so as to be expanded (vaporized), is brought into a gas-liquid mixed state to be fed to the economizer 5, and thus, is temporarily stored in the economizer 5.

In the inside of the economizer 5, the refrigerant which is expanded by the high-pressure expansion valve 4 and is in a gas-liquid mixed state is separated into a gas phase component and a liquid phase component. Here, the separated liquid-phase refrigerant is further expanded by the low-pressure expansion valve 6 provided in a refrigerant pipe 17 extended from the bottom portion of the economizer 5 and is fed to the evaporator 7. The gas-phase refrigerant separated by the economizer 5 is fed to an intermediate stage portion of the turbo compressor 2 via a refrigerant pipe 18 extended from the upper portion of the economizer 5 and is compressed again.

In the inside of the evaporator 7, a low-temperature liquid refrigerant which is adiabatically expanded in the low-pressure expansion valve 6 is heat-exchanged with water, and the cooled water is used as a cooling-heating medium for air conditioning, industrial cooling water, or the like. The refrigerant vaporized by the heat exchange with water is sucked into the turbo compressor 2 again via the suction pipe 14 to be compressed, and this cycle is repeated below.

Unlike a case where a high-pressure refrigerant such as R134a is used, in a case where a low-pressure refrigerant such as R1233zd is used as the refrigerant, it is not necessary to form the economizer 5 is a drum shell shape. Accordingly, as shown in FIGS. 1 to 3, for example, the economizer 5 is formed in an approximately rectangular parallelepiped shape.

As described above, the economizer 5 is installed to be interposed between the condenser 3 and the evaporator 7, one surface of the economizer 5 is adjacent to a drum shell-shaped curved wall 3a of the condenser 3, and the curved wall 3a is shared as a structure wall of the economizer 5 itself. That is, in the front view (refer to FIG. 1), in the rectangular parallelepiped economizer 5 which is vertically elongated, the upper corner portion on the condenser 3 side is formed to be cut out in an arc shape by the condenser 3, and the portion which is cut out in an arc shape is configured to be closed by the curved wall 3a of the condenser 3. In addition, a curved wall which comes into close contact with the curved wall 3a of the condenser 3 may be provided in the economizer 5 such that the condenser 3 and the economizer 5 can be separated from each other.

Figure 4:
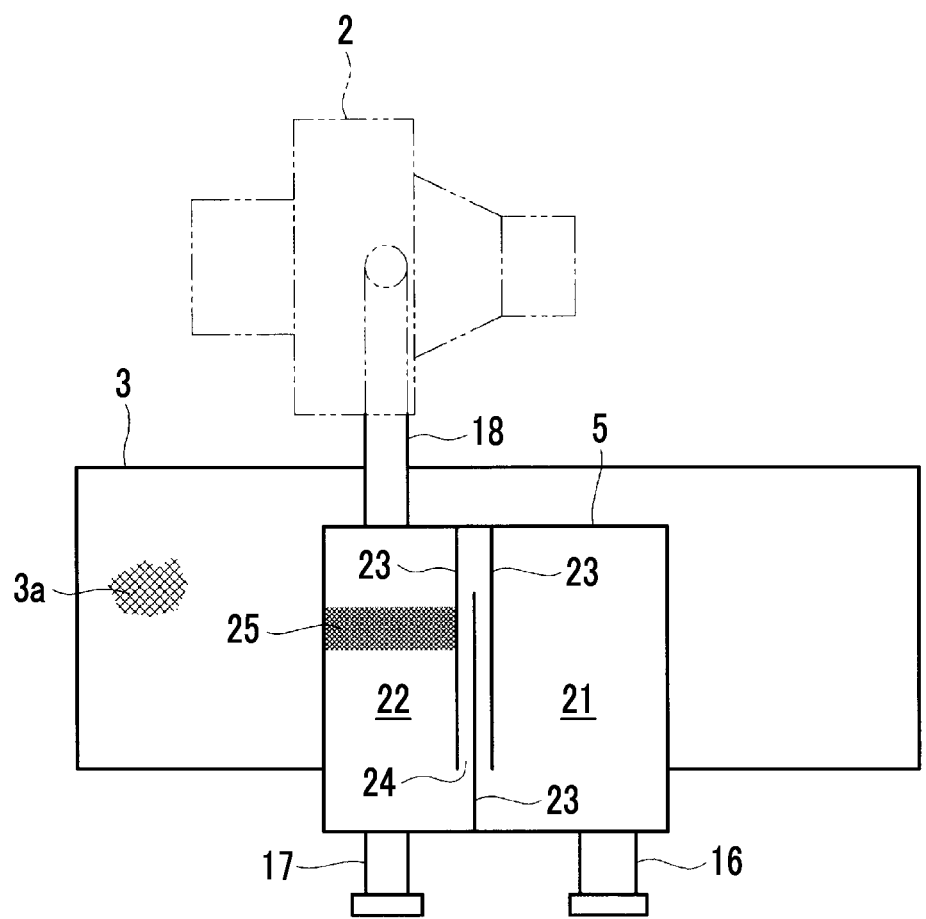
FIG. 4 is a side view of an economizer taken along line IV-IV of FIG. 1.

As shown in FIGS. 2 to 4, the economizer 5 is formed to extend in a longitudinal axis direction of the curved wall 3a of the condenser 3 adjacent to the economizer 5, and when viewed in the longitudinal axis direction (refer to FIG. 1), the economizer 5 is formed such that a height dimension H of the economizer 5 is greater than a maximum width dimension W thereof. The height of the lowest portion of the economizer 5 is higher than the lowest portion of the evaporator 7 in order to extend the refrigerant pipes 16 and 17 downward. That is, the height dimension H of the economizer 5 is maximally secured to the extent that the economizer 5 does not interfere with the disposition of the discharge pipe 15 of the turbo compressor 2 or the refrigerant pipes 16 and 17. In addition, a length dimension L of the economizer 5 shown in FIG. 2 is greater than the height dimension H shown in FIG. 1.

As shown in FIG. 4, the economizer 5 is defined such that a gas-liquid inflow chamber 21 and a gas-liquid separation chamber 22 are adjacent to each other in the longitudinal axis direction of the condenser 3 inside the economizer 5. For example, a portion between the gas-liquid inflow chamber 21 and the gas-liquid separation chamber 22 is partitioned by three baffle plates 23 such that the chambers can communicate with other. That is, for example, a labyrinthine gas-liquid separation passage is formed between the plurality of baffle plates 23 which are alternately disposed at intervals on the inner wall on the economizer 5 side.

The internal space of the gas-liquid separation chamber 22 is vertically partitioned by a porous demister 25. The demister 25 is disposed above the intermediate portion of the gas-liquid separation chamber 22 in the height direction. The refrigerant pipe 16 coupled to the condenser 3 is connected to the bottom portion of the gas-liquid inflow chamber 21, and the refrigerant pipe 17 coupled to the evaporator 7 is connected to the bottom portion of the gas-liquid separation chamber 22. The refrigerant pipe 18 coupled to the intermediate stage portion of the turbo compressor 2 is connected to the upper portion of the gas-liquid separation chamber 22.

The refrigerant in a gas-liquid mixed state flowing from the condenser 3 into the gas-liquid inflow chamber 21 of the economizer 5 via the refrigerant pipe 16 passes through the gas-liquid separation passage 24 between the baffle plates 23. Accordingly, the refrigerant is roughly divided into a liquid phase component and a gas phase component and the components flow into the gas-liquid separation chamber 22. In addition, the components pass through the demister 25 installed in the gas-liquid separation chamber 22 and thus, the liquid phase component is almost completely separated from the gas phase component. The liquid phase component is fed to the evaporator 7 via the refrigerant pipe 17 and the gas phase component is fed to the intermediate stage portion of the turbo compressor 2 via the refrigerant pipe 18.

Figure 5:
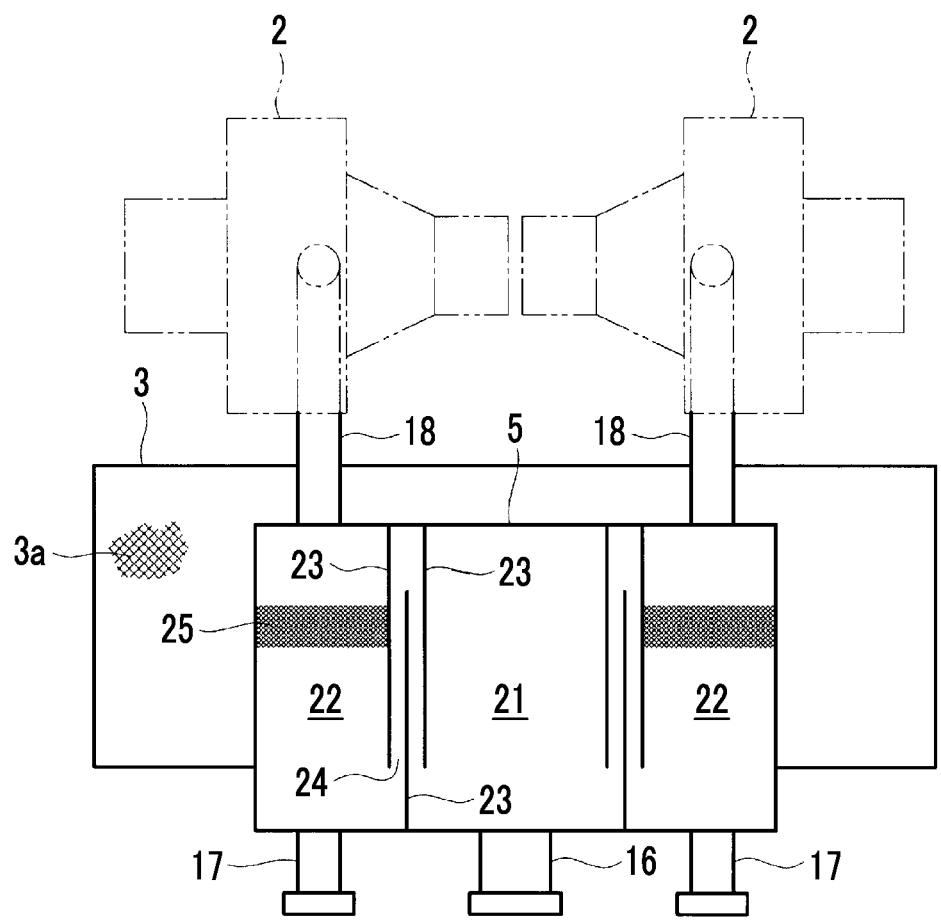
FIG. 5 is a side view showing another embodiment of the economizer.

As shown in FIG. 5, in a case where two turbo compressor 2 are installed, two gas-liquid separation chambers 22 are disposed on both sides of the gas-liquid inflow chamber 21 of the economizer 5 to be adjacent to each other via the baffle plates 23 (gas-liquid separation passage 24). That is, the two gas-liquid separation chambers 22 are disposed to be arranged back to back in a state where one gas-liquid inflow chamber 21 is interposed therebetween. The two gas-liquid separation chambers 22 are respectively disposed to be close to the two turbo compressors 2 and are connected to the two turbo compressors 2 by the refrigerant pipes 18.

In this case, the refrigerant in a gas-liquid mixed state flowing from the condenser 3 into the gas-liquid inflow chamber 21 via the refrigerant pipe 16 passes through the gas-liquid separation passage 24 to flow into both gas-liquid separation chambers 22 and is separated into gas and liquid in each gas-liquid separation chamber 22. The liquid phase component is fed to the evaporator 7 via each refrigerant pipe 17 and the gas phase component is fed to the intermediate stage portion of the turbo compressor 2 via each refrigerant pipe 18.

Meanwhile, as shown in FIGS. 1 to 3, similarly to the economizer 5, in the lubricant tank 8 which is installed to be interposed between the condenser 3 and the evaporator 7 along with the economizer 5, one surface of the lubricant tank 8 is adjacent to a drum shell-shaped curved wall 3a of the condenser 3, and the curved wall 3a is shared as a structure wall of the lubricant tank 8 itself. The lubricant tank 8 may be joined to the curved wall 3a of the condenser 3 or may be configured to be able to be separated from the curved wall 3a.

In the turbo refrigeration apparatus 1 configured as described above, the economizer 5 is installed to be interposed between the condenser 3 and the evaporator 7, and thus, it is possible to install the economizer 5 while effectively using an empty space positioned between the condenser 3 and the evaporator 7. Particularly, in a case where a low-pressure refrigerant is used and thus, it is not necessary to form the economizer 5 in a drum shell shape, the economizer 5 is formed in a free shape and installed in the empty space between the condenser 3 and the evaporator 7. Accordingly, a sufficient internal volume is provided in the economizer 5 and it is possible to increase gas-liquid separation performance.

In addition, the economizer 5 is installed to be adjacent to the drum shell-shaped curved wall 3a of the condenser 3, and the curved wall 3a is shared as the structure wall of the economizer 5 itself. Accordingly, the economizer 5 and the condenser 3 come into close contact with each other without a gap. Accordingly, the empty space between the economizer 5 and the condenser 3 is maximally used, and thus, a more compact turbo refrigeration apparatus 1 can be configured while the internal volume of the economizer 5 is expanded.

In addition, the economizer 5 is formed to extend in the longitudinal axis direction of the curved wall 3a of the condenser 3 adjacent to the economizer 5, and the height dimension H of the economizer 5 is greater than the maximum width dimension W thereof when viewed in the longitudinal axis direction.

Accordingly, the height dimension H of the economizer 5 increases, and thus, it is possible to increase gas-liquid separation performance of the economizer 5, that is, an action of dropping the liquid phase component except for the gas phase component by the gravity inside the economizer 5. Particularly, the shape of the economizer 5 can be freely formed, which is effective to the turbo refrigeration apparatus 1 which uses a low-pressure refrigerant. Moreover, if the length dimension L (refer to FIG. 2) of the economizer 5 is greater than the height dimension H (refer to FIG. 1), the internal volume of the economizer 5 increases, and thus, it is possible to increase gas-liquid separation performance.

In the case where the plurality of (here, two) turbo compressors 2 are provided, the economizer 5 is configured to include the gas-liquid inflow chamber 21 and the plurality of (here, two) gas-liquid separation chambers 22 adjacent to the gas-liquid inflow chamber 21, and each of the plurality of gas-liquid separation chambers 22 is disposed so as to be close to the turbo compressor 2.

Accordingly, the plurality of gas-liquid separation chambers 22 of the economizer 5 are disposed at positions closest to the two turbo compressor 2, and thus, the length of the refrigerant pipe 18 connecting the gas-liquid separation chamber 22 and the turbo compressor 2 to each other can be minimized and can be formed linearly. Therefore, compactness of the turbo refrigeration apparatus 1 is improved, and it is possible to decrease a pressure loss or a flow path loss of the refrigerant to increase efficiency.

As described above, in the case where the plurality of gas-liquid separation chambers 22 are provided, as shown in FIG. 5, the two gas-liquid separation chambers 22 are disposed to be arranged back to back in a state where the one gas-liquid inflow chamber 21 is interposed therebetween. Accordingly, the one gas-liquid inflow chamber 21 is shared as the two gas-liquid separation chambers 22, and the refrigerant in a gas-liquid mixed state flowing into the gas-liquid inflow chamber 21 is divided into both gas-liquid separation chambers 22 so as to be sucked into the turbo compressor 2.

Therefore, the refrigerant in a gas-liquid mixed state flowing into the gas-liquid inflow chamber 21 is sucked from both gas-liquid separation chambers 22, and thus, the flow rate of the refrigerant inside the gas-liquid inflow chamber 21 decreases, and it is possible to increase gas-liquid separation effects. Accordingly, compared to a case where two gas-liquid inflow chambers 21 and two gas-liquid separation chambers 22 are provided, if the same level of gas-liquid separation performance is obtained, the size of the economizer 5 decreases, and thus, compactness of the turbo refrigeration apparatus 1 can be realized.

Moreover, in the turbo refrigeration apparatus 1, the lubricant tank 8 is installed between the condenser 3 and the evaporator 7 along with the economizer 5, the lubricant tank 8 is installed to be adjacent to the drum shell-shaped curved wall 3a of the condenser 3, and the curved wall 3a is shared as the structure wall of the lubricant tank 8 itself.

Accordingly, not only the economizer 5 but also the lubricant tank 8 can be installed by effectively using the empty space positioned between the condenser 3 and the evaporator 7. Particularly, it is suitable for a tank-shaped auxiliary device such as the lubricant tank 8 to which a high pressure is not applied.

As described above, according to the turbo refrigeration apparatus 1 according to the present embodiment, particularly, in the case where a low-pressure refrigerant is used, it is possible to improve compactness of the turbo refrigeration apparatus 1 while installing the economizer 5 having a sufficient internal volume, particularly, and it is possible to decrease a pressure loss of a refrigerant to increase efficiency.

Moreover, the present invention is not limited to only the configuration of the above-described embodiment, modifications or improvements can be appropriately applied to the present invention, and embodiments to which the modifications or the improvements are applied are also included in the scope of the present invention.

For example, in the above-described embodiment, the economizer 5 or the lubricant tank 8 is installed to be adjacent to the condenser 3 and the curved wall 3a of the condenser 3 is shared as the structure wall of each of the members 5 and 8. However, the economizer 5 or the lubricant tank 8 may be installed to be adjacent to the evaporator 7 so as to be shared as the curved wall of the evaporator 7 itself. In addition, the economizer 5 or the lubricant tank 8 may be installed to be shared as the curved walls of both the condenser 3 and the evaporator 7.

Moreover, an auxiliary device other than the lubricant tank 8 may be installed between the condenser 3 and the evaporator 7. Also in this case, the drum shell-shaped curved wall of the condenser 3 or the evaporator 7 may be shared as the structure wall of the auxiliary device itself.

As examples of another auxiliary device, tank members such as a sub-cooler, a cooling water tank, or a refrigerant tank, boxes which accommodate power system members such as switch boards or control boards can be exemplified. However, the present invention is not limited to this.

In addition, in order to effectively use the space between various pipes and the condenser 3 or the evaporator 7, the various pipes may be formed in a duct shape and may be disposed to extend along an outer peripheral surface of a drum shell of the condenser 3 or the evaporator 7.

REFERENCE SIGNS LIST

1: turbo refrigeration apparatus
2: turbo compressor
3: condenser
3a: curved wall of condenser
4: high-pressure expansion valve (control valve)
5: economizer
7: evaporator
8: lubricant tank (auxiliary device)
10: inverter unit
11: operation panel
13: electric motor
14: suction pipe
15: discharge pipe
16, 17, 18: refrigerant pipe
21: gas-liquid inflow chamber
22: gas-liquid separation chamber
H: height dimension of economizer
W: maximum width dimension of economizer

The invention claimed is:

1. A turbo refrigeration apparatus, comprising:
a turbo compressor which compresses a refrigerant;
a condenser which condenses the compressed refrigerant;
a control valve which expands the condensed refrigerant;
an evaporator which evaporates the expanded refrigerant; and
an economizer which is installed to be interposed between the condenser and the evaporator and separates the refrigerant expanded by the control valve into gas and liquid,
wherein a plurality of turbo compressors are provided, and
wherein the economizer includes a gas-liquid inflow chamber into which the refrigerant expanded by the control valve flows in a gas-liquid mixed state, and a plurality of gas-liquid separation chambers which are adjacent to the gas-liquid inflow chamber and respectively close to the plurality of turbo compressors so as to separate the refrigerant into gas and liquid, supply a gas phase component to the plurality of turbo compressors via each refrigerant pipe, and supply a liquid phase component to the evaporator,
wherein one of the plurality of turbo compressors is connected to one of the plurality of gas-liquid separation chambers via one refrigerant pipe, and another one of the plurality of turbo compressors is connected to another one of the plurality of gas-liquid separation chambers via another refrigerant pipe.

2. The turbo refrigeration apparatus according to claim 1, wherein at least one of the condenser and the evaporator is formed in a drum shell shape, the economizer is installed to be adjacent to a curved wall of the condenser or the evaporator formed in the drum shell shape, and the curved wall is shared as a structure wall of the economizer.

3. The turbo refrigeration apparatus according to claim 2, wherein the economizer is formed to extend in a longitudinal axis direction of the curved wall adjacent to the economizer and has a height dimension of the economizer which is greater than a maximum width dimension thereof when viewed in the longitudinal axis direction.

4. The turbo refrigeration apparatus according to claim 1, wherein two gas-liquid separation chambers are arranged back to back in a state where one gas-liquid inflow chamber is interposed therebetween.

5. The turbo refrigeration apparatus according to claim 1, wherein a lubricant tank, a sub-cooler, a cooling water tank, a refrigerant tank, or a box which accommodate power system members along with the economizer is installed between the condenser and the evaporator, and
wherein at least one of the condenser and the evaporator is formed in a drum shell shape, the lubricant tank, the sub-cooler water thank, the refrigerant tank, or the box which accommodate power system members is installed to be adjacent to a curved wall of the condenser or the evaporator formed in the drum shell shape, and the curved wall is shared as a structure wall of the lubricant tank, the sub-cooler, the cooling water tank, the refrigerant tank, or the box which accommodate power system members.

6. The turbo refrigeration apparatus according to claim 2, wherein a lubricant tank, a sub-cooler, a cooling water tank, a refrigerant tank, or a box which accommodate power system members along with the economizer is installed between the condenser and the evaporator, and
wherein at least one of the condenser and the evaporator is formed in a drum shell shape, the lubricant tank, the sub-cooler, the cooling water tank, the refrigerant tank, or the box which accommodate power system members is installed to be adjacent to a curved wall of the condenser or the evaporator formed in the drum shell shape, and the curved wall is shared as a structure wall of the lubricant tank, the sub-cooler, the cooling water tank, the refrigerant tank, or the box which accommodate power system members.

7. The turbo refrigeration apparatus according to claim 3, wherein a lubricant tank, a sub-cooler, a cooling water tank, a refrigerant tank, or a box which accommodate power system members along with the economizer is installed between the condenser and the evaporator, and
wherein at least one of the condenser and the evaporator is formed in a drum shell shape, the lubricant tank, the sub-cooler, the cooling water tank, the refrigerant tank, or the box which accommodate power system members is installed to be adjacent to a curved wall of the condenser or the evaporator formed in the drum, shell shape, and the curved wall is shared as a structure wall of the lubricant tank, the sub-cooler, the cooling water tank, the refrigerant tank, or the box which accommodate power system members.

8. The turbo refrigeration apparatus according to claim 4, wherein a lubricant tank, a sub-cooler, a cooling water tank, a refrigerant tank, or a box which accommodate power system members along with the economizer is installed between the condenser and the evaporator, and
wherein at least one of the condenser and the evaporator is formed in a drum shell shape, the lubricant tank, the sub-cooler, the cooling water tank, the refrigerant tank, or the box which accommodate power system members is installed to be adjacent to a curved wall of the condenser or the evaporator formed in the drum shell shape, and the curved wall is shared as a structure wall of the lubricant tank, the sub-cooler, the cooling water tank, the refrigerant tank, or the box which accommodate power system members.

* * * * *